M. L. SEVERY AND G. B. SINCLAIR.
SYNCHRONIZER.
APPLICATION FILED MAR. 8, 1913.

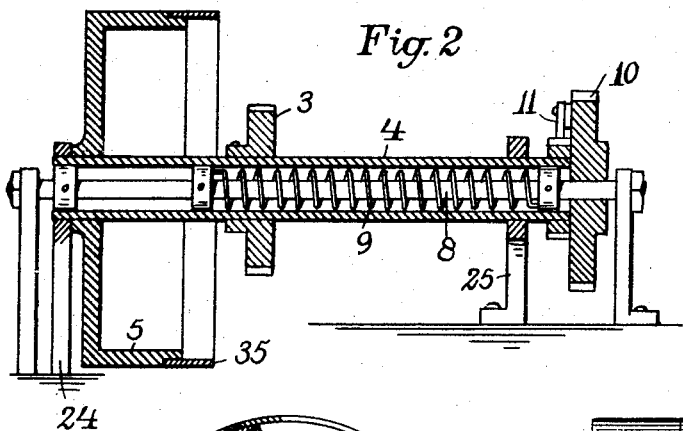

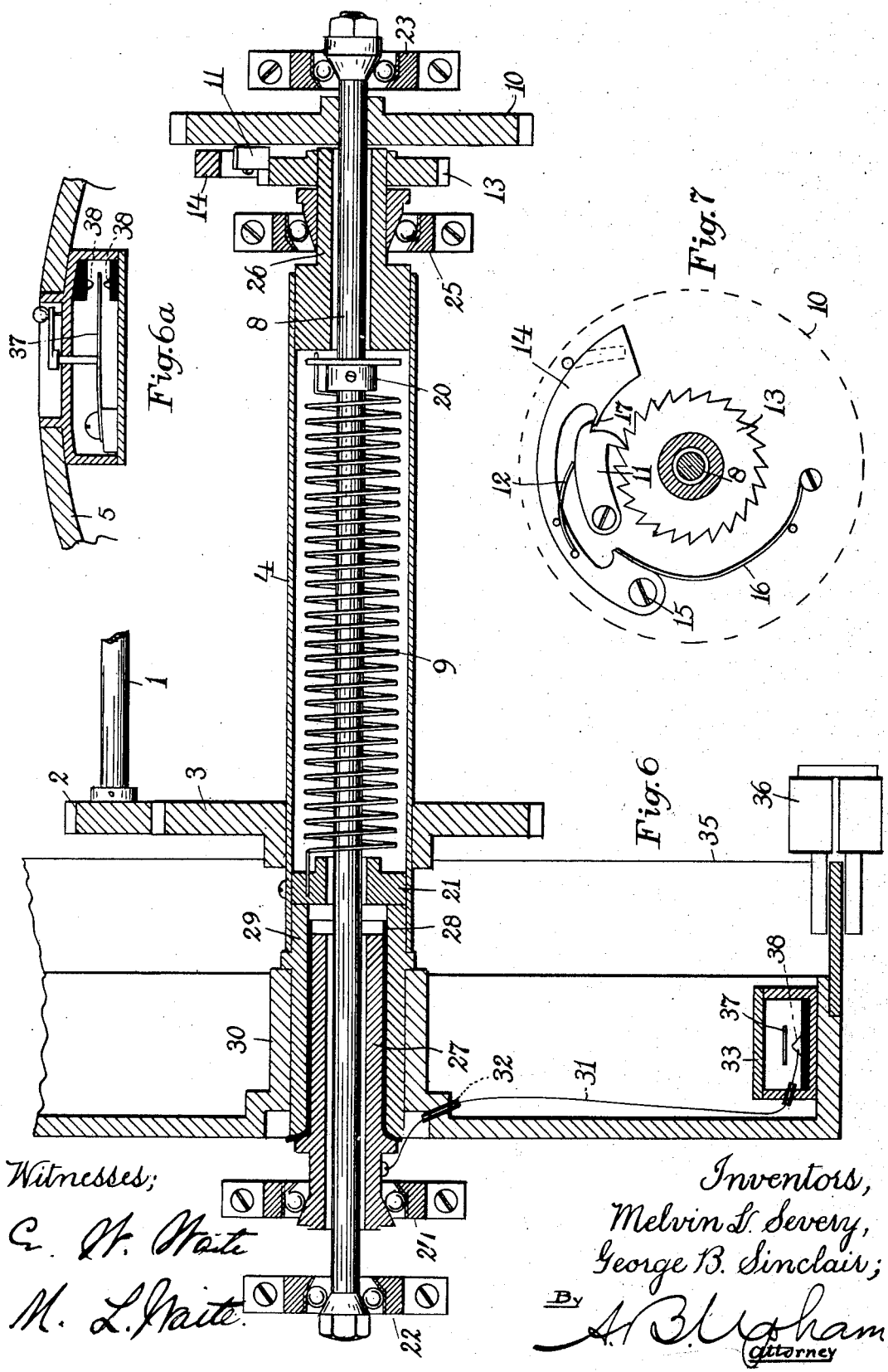

1,332,414.

Patented Mar. 2, 1920.
5 SHEETS—SHEET 5.

Witnesses;
E. W. Waite
M. L. Waite

Inventors,
Melvin L. Severy,
George B. Sinclair;
By A. B. Upham
Attorney.

UNITED STATES PATENT OFFICE.

MELVIN L. SEVERY, OF ARLINGTON HEIGHTS, MASSACHUSETTS, AND GEORGE B. SINCLAIR, OF GEORGETOWN, MAINE.

SYNCHRONIZER.

1,332,414.  Specification of Letters Patent.  Patented Mar. 2, 1920.

Application filed March 8, 1913. Serial No. 753,014.

*To all whom it may concern:*

Be it known that we, MELVIN L. SEVERY, of Arlington Heights, in the county of Middlesex and Commonwealth of Massachusetts, and GEORGE B. SINCLAIR, of Georgetown, Sagadahoc county, State of Maine, both citizens of the United States, have invented certain new and useful Improvements in Synchronizers, of which the following is a specification.

This invention is in the line of speed-controlling means, which has for its especial object the control with practically absolute synchronism of the speed of the pulsation producing devices employed in the electrical musical instruments of the kind set forth in our applications Serial Nos. 273,199 and 745,400, filed respectively August 7, 1905, and January 31, 1913. Said applications were for a time co-pending with this, have during the prosecution hereof eventuated as Patents No. 1,196,401, dated August 29, 1916, and No. 1,198,070, dated Sept. 12, 1916.

The importance of such perfect synchronism is the more easily understood when it is realized that such pulsations of current must exactly accord with the vibrations of the sonorous strings actuated thereby, even when such pulsations are at the rates of several thousand per second, as they are for the upper notes of the instrument.

But whether producing these higher notes, or those lower down the scale, if the current-pulsator is either fast or slow there will ensue not alone a failure to obtain the full strength of the musical tones, but the latter will be uneven, wavering, of wrong pitches and poor quality. Such defects will, of course, completely ruin the instrument for true musical purposes.

By means of the synchronizer which constitutes the subject matter of this application, we are able to control the speed of our current-pulsating devices with such an accuracy that the most expert ear cannot detect the slightest imperfection in the tones produced thereby.

Figure 8:
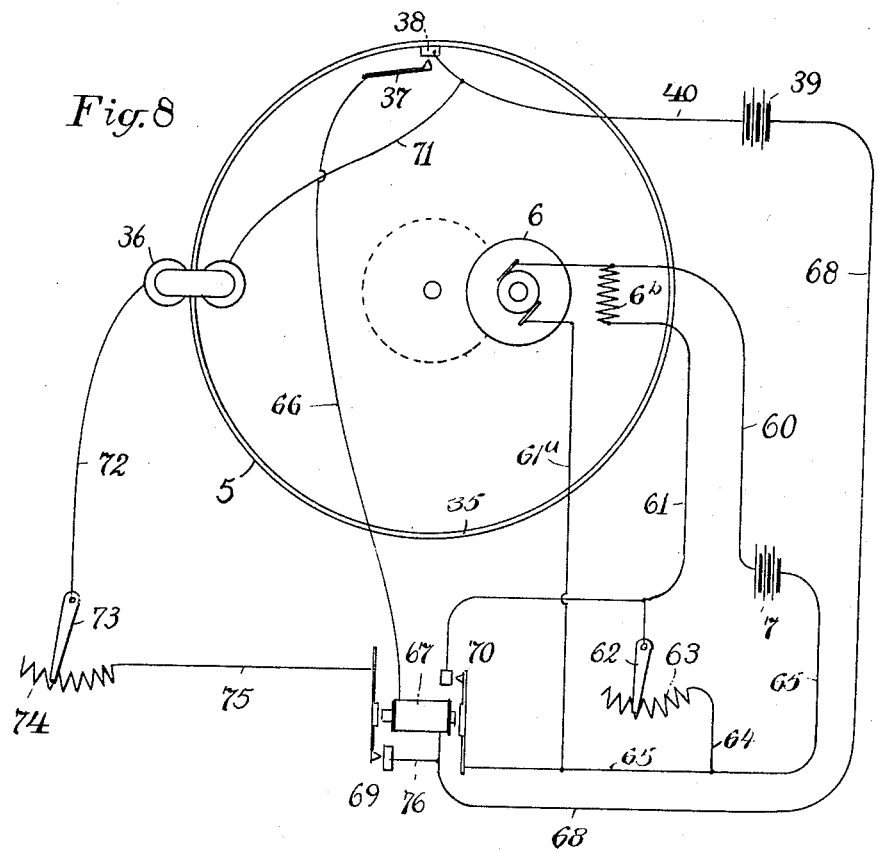
Figure 9:
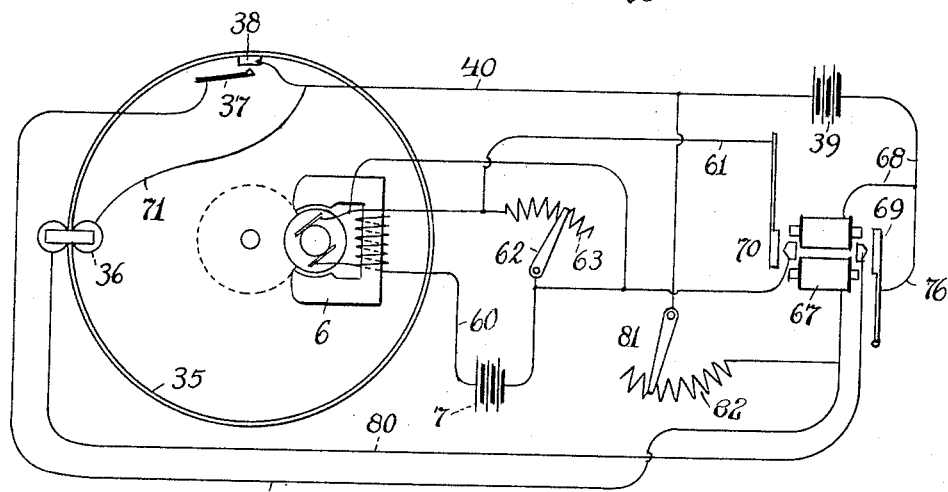
Figure 10:
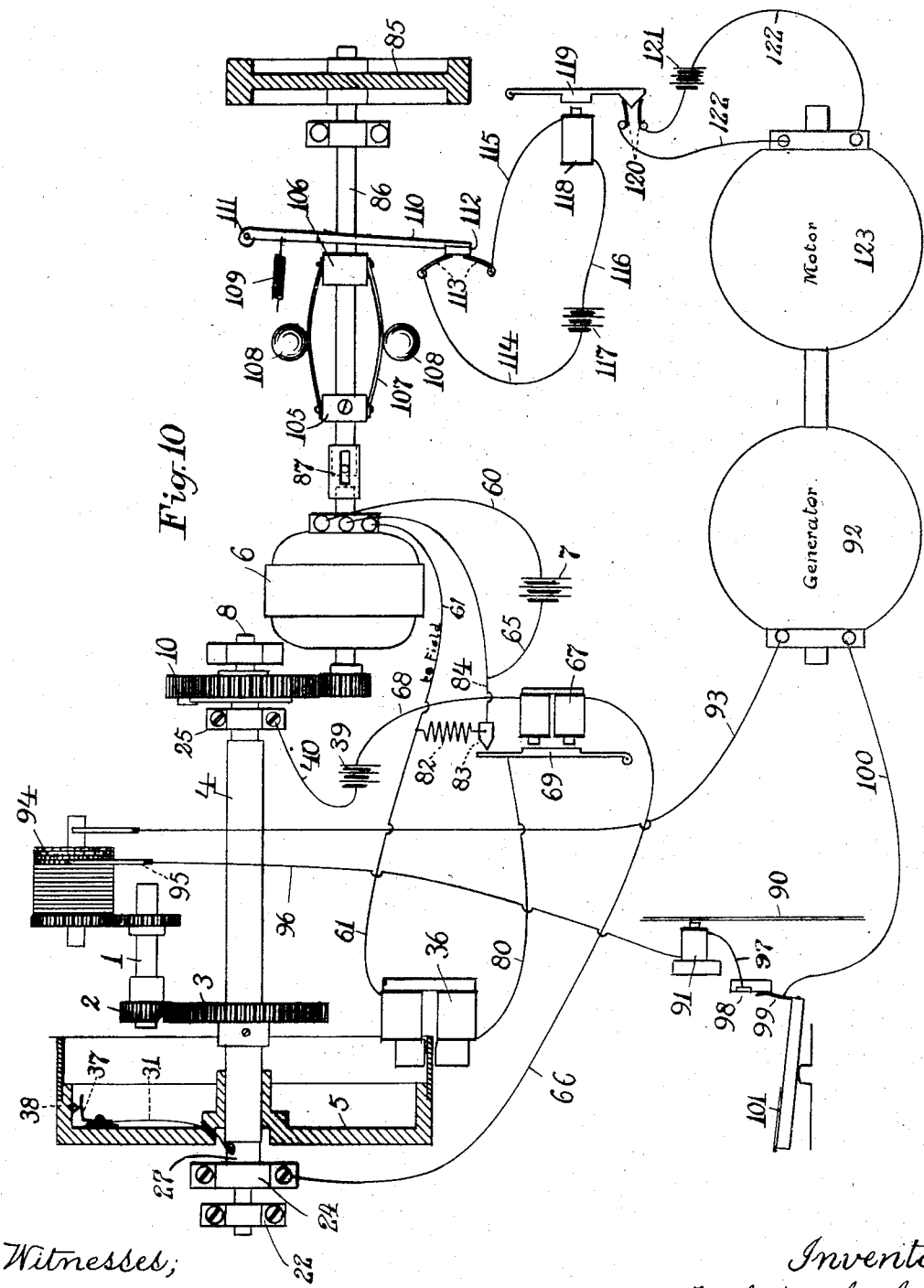
Figure 11:
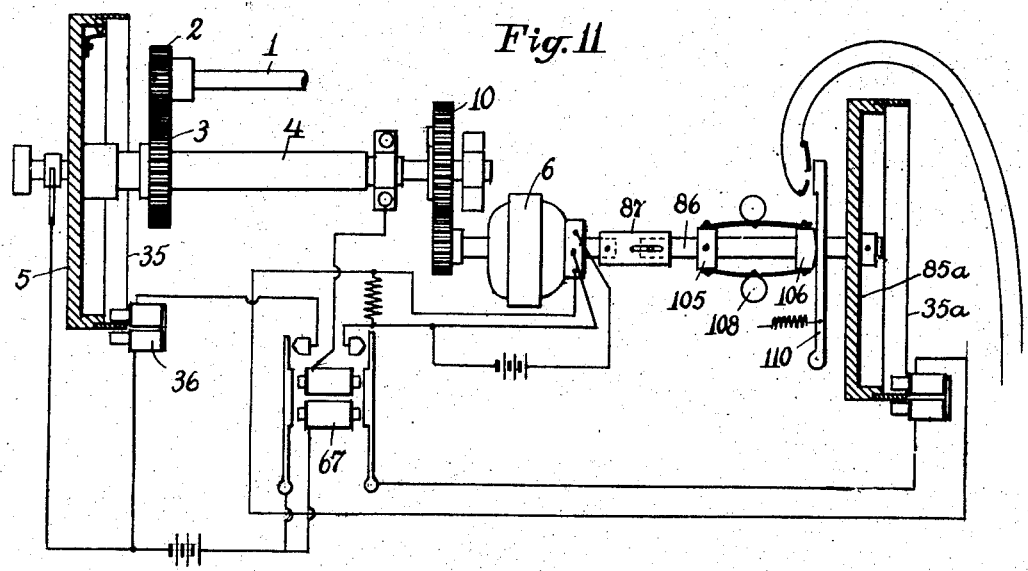
Figure 12:
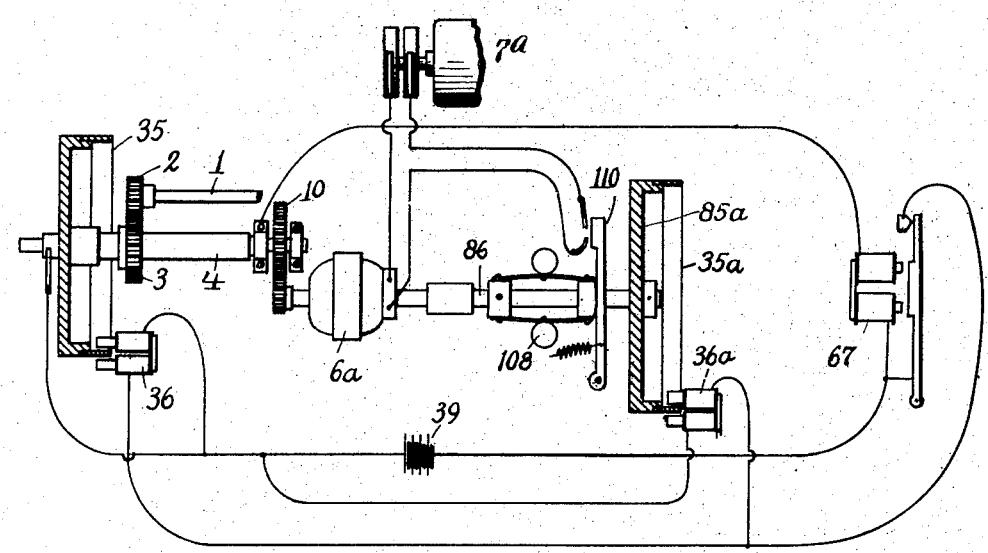
Figure 13:
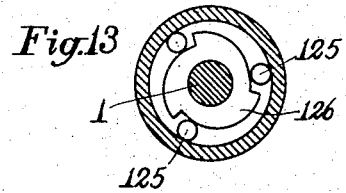

Referring to the drawings forming part of this specification, Figure 1 is a plan view of a synchronizer embodying our invention in one of its constructions. Fig. 2 is a central longitudinal section of the balance wheel and shaft of the same. Fig. 3 is a transverse section of said shaft. Fig. 4 is a peripheral view of said balance wheel. Fig. 5 is a detail view of the clutch connection between said balance wheel and its driving means. Fig. 6 is a longitudinal central section of the balance wheel and shaft substantially full size. Fig. 6$^a$ is a sectional view of the balance wheel rim, showing the centrifugal circuit closing device. Fig. 7 is a detail view of the clutch-mechanism shown in Fig. 6. Fig. 8 is a diagram illustrating an improved wiring-system for the synchronizer. Fig. 9 is a diagram of another system of wiring for the same. Fig. 10 is a plan view partially in section of our preferred form of synchronizer, showing the same in conjunction with certain parts of the electrical musical instrument for which the same is designed. Fig. 11 shows another modification of our synchronizer. Fig. 12 is a diagram of a synchronizer the driving motor of which takes its energizing current from an alternating current source. Fig. 13 is a detail sectional view of a clutch used in a portion of the mechanism.

In said drawings, the reference numeral 1 designates the shaft of any rotating mechanism whose speed it is desired to control with the perfect synchronism above described. This shaft, or driven device, is connected by suitable gears 2, 3 to the tubular shaft 4 rigid with the balance wheel or fly-wheel 5. The driving means, here shown as an electric motor 6, receives its current from the source 7, but is not connected directly with said tubular shaft, being adapted to drive a shaft 8 located concentrically within the same.

Between the inner shaft 8 and the tubular shaft 4 is located a helical spring 9 encircling the inner shaft and having one end attached to one shaft and its other end to the other shaft. Consequently, any rotation of the inner shaft 8 will not be communicated to the tubular shaft 4 until the tension imparted to the spring 9 is sufficient to overcome the resistance of the propelled factor. By this means, the lesser speed-variations of the potentializer or motor 6 will be prevented from being communicated to the propelled factor, and the latter made thereby more steady and uniform in motion.

When it comes to starting the machinery, however, the sudden strain put by the motor upon the spring 9 is very liable to break it or at least to change its tension. To prevent this, the spur gear 10 (Fig. 7) which is fixed to the inner shaft 8, is provided with a pawl 11 urged by a spring 12 into engagement with a ratchet wheel 13 fixed on the tubular shaft 4. By this means, when the motor starts, the shaft 8, acting through said pawl and ratchet, turns the tubular shaft 4 without the aid of said spring.

In the construction shown in Fig. 5, the pawl 11 is not pivoted to the gear 10, but to a weighted arm 14 pivoted at 15 to said gear. Whichever way is employed, a pivoted arm 14 is used, and a spring 16 provided for normally holding such arm at its inner limit of swing. When centrifugal force, caused by the rotation of the parts faster than a certain limit, overcomes the restraint of the spring 16, then the free end of said arm 14 swings outward, and, by the action of its finger 17 on the extremity of said pawl 11, carries the latter out of engagement with the ratchet 13 and retains it in such position so long as the speed of the mechanism remains at such rate.

The strength of the spring 16 and the centrifugal force of said parts are so adjusted that said disengagement occurs when the driven mechanism has very nearly reached its specified speed, and, consequently, the only tension now put upon the spring 9 is that required for maintaining the action of the driven device.

In the arrangement shown in Fig. 6, the spring 9 is attached at one end to the collar 20 fixed on the inner shaft 8, while its opposite end is attached to the tubular collar 21 fixed to the tubular shaft 4. The extremities of the shaft 8 are rotatably supported by ball-bearings 22, 23, in order that it may revolve with the least possible friction. The tubular shaft 4 is similarly supported by ball-bearings 24, 25, the bearings 25 accommodating the sleeve extension 26; and the bearing 24, the sleeve extension 27. The latter is electrically separated from the tubular shaft 4 by the cylindrical insulation 28, inserted between said extension 27 and the sleeve 29 forced thereon; said sleeve being fastened within the end of the tubular shaft 4. The hub 30 of the fly-wheel 5 is in its turn secured tightly upon the sleeve 29 so that said parts 4, 29, 28 and 27 are all rigid with each other.

A wire 31 being attached to the extension 27 and passed through a suitably insulated hole 32 to the circuit closing device 33, the two poles of a circuit can be connected with the bearings 24 and 25, and the circuit controlled by the action of said device.

A part of the rim of the fly-wheel 5 is an annulus of copper or other conducting non-magnetic material 35, and located close to the opposite surfaces of this annulus are the pole pieces of the horse-shoe magnet 36, which, when energized, acts to retard the rotation of said annulus and of the fly-wheel and connected parts.

For energizing this electromagnet 36 when the speed of the driven mechanism reaches a predetermined limit, and hence to retard said mechanism we have devised several slightly differing constructions. That set forth in Fig. 1 is as follows: Here, as represented in Fig. 3, the circuit closing device is normally closed, but when the rotation of the fly-wheel reaches a predetermined speed, the resultant centrifugal force throws the resilient leaf contact 37 out of touch with the contact point 38.

Before such speed is reached, however, and while the circuit remains closed, the current from the source 39 passes through the wire 40, bearing 25, tubular shaft 4, fly-wheel 5 and said contacts 37, 38; then through the wire 31 to the extension 27, bearing 24 (Fig. 6), wire 41 (Fig. 1), wire 42, resistance 43 and wire 44 back to said source; such resistance acting to allow only a slight current to flow through the circuit. The moment the fly-wheel reaches the predetermined speed, the circuit is broken, and the current from said source is now compelled to pass solely by wire 45 to the relay magnet 46, and thence back through the wire 42, resistance 43 and wire 44. So long as the circuit is closed by the contacts 37, 38, there will of course be two paths for the current, one including the relay magnet 46, but owing to the relatively high resistance offered by the winding of the magnet 46, little or no current will pass by way of the conductor 45 and magnet 46, hence the circuit-closer 47 will not at such times be drawn to circuit closing position by said magnet.

Upon the breaking of the first-named circuit, the current then passes to and energizes said relay magnet 46, and thereby closes the circuit between the contacts 47. This sends current from the source 39 through the wires 45, 45ª, contacts 47, wire 48, electromagnet 36, and wire 49 back to said source. Said electromagnet 36 now acts both to retard the fly-wheel as previously set forth, and at the same time closes the circuit between the contacts 50, shown in Figs. 1 and 4. This closure permits current from the source 7 to flow through the wires 51, 52 to the contacts 50, and thence back through the wires 53, 54, field-windings of the motor 6 and wire 55 to said source 7; thus cutting out the resistance 56 normally in the circuit to said windings.

The motor 6 being shunt wound, this increase of current to its field at once acts to slow it down; so that we have acting simultaneously a slower motion of the motor, and a frictional retardation of the flywheel; that is, a combined cutting down of power, and an absorption of inertia; the most effective and immediately acting of speed-reducers which can be devised.

In the construction illustrated by Fig. 8, the fly-wheel 5 is rotated by the motor 6 as already described, one armature brush of which is connected by wire 60 to one pole of the current-source 7, while the other armature brush is connected by wires 61$^a$ and 65 to the opposite pole of said current-source 7, thus completing a circuit. 6$^b$ indicates the motor field winding, one terminal of which is connected by wire 60 with one pole of the current-source 7, the other terminal connecting by wire 61, movable contact 62, resistance 63, and wires 64, 65 with the opposite pole of said current-source 7. Under normal conditions, or so long as the contacts 37, 38 are separated, current from the source 7 will divide, one circuit being from a pole of said source by wire 60 to one brush of the motor, and by the other brush of said motor, wires 61$^a$ and 65 back to the opposite pole of said source. The second circuit or path will be from a pole of the source 7, by wire 60, motor field winding 6$^b$, wire 61, movable contact 62, resistance 63, and wires 64 and 65 back to the other pole of said source. This introduces into series with the motor field winding a resistance which weakens the field, and causes the motor to speed up.

When the speed of the fly-wheel 5 increases sufficiently to cause contact-arm 37 to be thrown out by centrifugal force and to establish contact with contact 38, the current-source 39 will be brought into action, relay magnet 67 will be energized, and two paths for current from said source 39 will be established. The first is by wire 40, contacts 37, 38, wire 66 to relay magnet 67, and by wire 68 back to said source 39. The energizing of relay magnet 67 causes the closing of the normally open contacts 69 and 70, and the establishment of the second path or circuit for current from source 39, which is by wires 40, 71 to the coils of magnet 36, thence by wire 72, movable contact 73, resistance 74, wire 75, contact 69, wires 76 and 68 back to current-source 39. This causes the magnet 36 to be energized, and to exert its retarding effect upon the fly-wheel 5, the annulus 35 cutting the magnetic lines of force.

At the same time by reason of the closing of contacts 70 through the action of relay magnet 67, a new or additional path for the motor field current is established, affording a free passage therefor around the resistance 62, 63. This path comprises the wire 60 proceeding from one terminal of source 7, the motor field winding 6$^b$, wire 61, contacts 70, and wire 65 back to the other pole of the source 7. This path being without resistance other than that of the conductors themselves, will cause a relatively freer flow of current to the motor field, while another portion of the current passes by way of wire 60, the motor brushes, and wires 61$^a$, 65 as before. The motor field being thus strengthened, its speed will be reduced, and thus the speed of fly-wheel 5 will be further retarded.

In the arrangement of wiring shown in Fig. 9, the motor field and source of current 7 are connected as illustrated in Fig. 8, but it otherwise differs in several particulars, notwithstanding that the circuit closing devices 37, 38 are here likewise normally open. When the speed of the fly-wheel reaches its predetermined limit and the circuit is closed by said devices, the current flows from the source 39 through the wire 40 to said contacts, and thence back through the wire 66, relay magnet 67, and wire 68 to said source. The relay magnet 67 being thus energized, the two circuit-closers 69, 70 are made to close the circuits, and so cause the current from the source 39 to traverse the wires 40, 71 to the electro-magnet 36, and thence back through the wire 80, contact 69, and wires 76, 68 to said source 39. This energizes said magnet 36 and so causes the fly-wheel to be magnetically retarded in the same manner as already described, and said closing of the contacts 70 at the same time shunts out the resistance 63 and slows down the motor.

The purpose in having the variable resistance 81, 82 shunted between the wires 40 and 66 is to prevent the sparking which would otherwise occur when the circuit is opened and closed by the contacts 37, 38. This is done by having such shunt circuit provided with just enough resistance to prevent the relay magnet from affecting the contacts 69, 70, while providing a path for the high tension induced currents which cause the sparking.

A preferred embodiment of our invention is illustrated in Figs. 10, 11 and 12, wherein there is represented a second fly-wheel 85 connected with the motor-shaft. By having the inertia of the motor and said fly-wheel 85 substantially equal to that of the fly-wheel 5 and the parts rotated by the shaft 4, the starting of the motor will be practically no more precipitate than will be the acceleration of said parts, and consequently the spring 9 (Fig. 6) will not be subjected to a sudden and excessive strain. In constructing the apparatus for a predetermined and unvarying load, it would be feasible with this construction to omit the pawl 11 and ratchet 13.

To permit the motor armature to have free axial play its shaft is joined to the fly-wheel shaft 86 by a loose coupling comprising a slotted sleeve 87, as indicated in Fig. 10.

The fly-wheel 5 in said Fig. 10 is provided with retarding means similar to that already set forth, but a single relay switch is employed to control delivery of current or electric energy both to the motor 6 and to the electromagnet 36 of the fly-wheel retarding device. Normally, the current from the source 7 traverses the wire 60 to the motor armature and field, and passes thence through a portion of the wire 61, through resistance 82, and wires 84. 65. back to said source, leaving electromagnet 36 of the fly-wheel retarder unenergized. Because of such resistance 82 in the circuit to the motor field, the motor rotates more rapidly than when, through the closure of the circuit by the finger 69 and contact 83, a path is afforded around said resistance 82, and a consequently larger supply of current is delivered to the motor field. This path around the resistance is afforded by wire 60 to the field, wire 61, electromagnet 36, wire 80, contact finger 69, contact 83, and wires 84, 65, back to the source 7. The electromagnet 67 of the relay switch is energized upon completion of its circuit through the action of centrifugal force throwing finger 37 into touch with the contact 38, whenever fly-wheel 5 reaches its maximum speed limit. A circuit is thereby established from the battery or current-source 39 by wire 68, electromagnet 67, wire 66, bearing 24, sleeve-extension 27, wire 31, finger 37, contact 38, fly-wheel 5, bearing 25, and wire 40, back to said source 39.

In this way, resistance is applied to the flywheel 5 and a slower motion simultaneously given to the motor through the action of a single relay switch.

The work for which this synchronizer is particularly designed is for controlling the pulsating devices by which a continuous current is converted into electric pulsations corresponding in frequencies with the frequencies of the sonorous bodies whose vibrations produce the musical tones desired. In Fig. 10 we show but a single sonorous body, such as a tensioned magnetically attractive string 90, actuated by an electromagnet 91 to which current is delivered from the generator 92 through the wire 93, pulsation producing devices consisting of a toothed disk or ring 94 and a brush 95 for each electromagnet, and wire 96; the return from such electromagnet 91 being through a wire 97, contact 98, key-controlled brush 99 and wire 100.

Now, it is found that considerably more current is delivered to the electromagnets 91 when such current is continuous, than when the same is rapidly pulsated. Consequently, should for any cause the motor 6 fail to maintain the rotation of the current pulsating disk or rings 94, leaving more or less of the brushes 95 in contact with the conducting teeth thereof, then any depression of the keys 101 would result in the delivery of an excessive current to said electromagnets from the generator 92.

To prevent this, we provide means whereby said generator will stop whenever the motor 6 fails to keep in motion. For this purpose, two collars 105 and 106 are mounted on the shaft 86, the collar 105 being fixed thereto while the other is slidable thereon. Between said collars are two or more flexible springs 107 each carrying a weight 108. When the shaft 86 rotates with sufficient speed, said weights fly outward and draw the collar 106 in toward the other. Pressed against the collar 106, when the motor is at rest, by a tension spring 109, is a lever arm 110 pivoted at 111 to any suitable support. The free end of this arm carries a conducting block 112 adapted to rest against, and have its motion limited by, the partially yielding contacts 113 when said arm is released from the pressure of the collar 106.

Said partially yielding contacts being joined by wires 114, 115 and 116 with a current-source 117 and an electromagnet or solenoid 118, whenever said block 112 touches said contacts, the circuit is closed and the electromagnet energized. This attracts the armature 119 and thereby completes the circuit between the contacts 120, permitting the current from the source 121 to traverse the wires 122 to the electric motor 123 by which the generator 92 is revolved.

The reverse is clear that when the motor 6 stops, the spring governor presses the arm 110 and its conducting block 112 away from the partially yielding contacts 113, the magnet 118 releases the armature 119 and the circuit to the motor 123 is broken.

The generator 92 being thus stopped whenever the motor 6 ceases to operate, there is no possibility of the electromagnets 91 receiving other than the pulsatory or interrupted currents for which they were designed.

As the propelled factor posseses weight and consequent inertia, it will offer greater resistance to the propelling force of the potentializer when starting from a state of rest, or when speeding up from a less than predetermined running speed, than when such predetermined speed is reached and becomes practically constant. In other words, greater expenditure of force is necessary to start the propelled factor from a state of rest into a state of motion, or to increase the speed or rate or motion, than is required to maintain it at a given speed when such speed is once attained. The predetermined speed being that at which the propelled factor is designed to run, and does in fact continue to run except for very slight variations or very occasional interruptions, such predetermined speed is herein referred to as the normal speed, and its resistance to rotation at such speed is treated as its normal resistance. The term "normal resistance" is used in this sense in one or more of the claims.

In the construction illustrated by Fig. 11, the main difference over the construction just described consists in providing the motor flywheel 85$^a$ with a copper annulus 35$^a$ and an electromagnet 36$^a$, whereby a drag or retarding influence is applied to the motor 6 simultaneously with that applied to the flywheel 5. Magnet 36$^a$ is energized in the same way as magnet 36 in Fig. 10, but magnet 36 in Fig. 11 is energized from source 39 through a second contact on relay 67. When the relay 67 closes the circuits of source 39 and of source 7, the resistance 82 is cut out, the current flowing from the source 7 to the motor 6 by the upper connection in Fig. 11, from the motor by the lower connection, thence to the magnet 36$^a$, around the resistance 82, and back through the contact at the right-hand side of relay 67 to the source 7 without passing through said resistance 82. Thus as before there is produced a slowing down of the motor 6, the drag or retarding action upon the fly-wheel 5 through magnet 36, and an added retardation through the drag or retarding effect of magnet 36$^a$ acting upon the copper annulus 35$^a$ of fly-wheel 85$^a$.

Fig. 12 shows the way in which an alternating motor 6$^a$ taking its energizing current from a source 7$^a$, can be similarly controlled. Inasmuch as in this kind of motor the armature cannot be retarded by switching in an excess of current, we depend upon the resistance given to the copper annuli 35 and 35$^a$ by the electromagnets 36 and 36$^a$ simultaneously, as described for the construction illustrated in Fig. 11.

To prevent a possible backward rotation of the shaft 4 from similarly turning the current pulsating disk 94 and perhaps bending some of the brushes 95 should they catch against the teeth of said disks, we prefer to have the gear 2 loosely mounted upon the shaft 1 and to provide a clutch connection between said gear and shaft, as shown in Fig. 13, whereby the rotation of the shaft 4 in the proper direction suitably turns the shaft 1, while an opposite turn on the part of the shaft 4 does not affect the other. The clutch illustrated is of the usual ball or roller type; 125 designating such balls or rollers, and 126 the fluted member carrying the same.

In order easily to understand the principle of our invention it is necessary to guard against a misconception which is almost certain to arise in the mind of anyone who has not given this matter profound study. Nothing is more natural, for example, than to think that in Fig. 10 the motor 6 drives the flywheel 5 and consequently the synchronized shaft 1; and in a certain remote sense this is true, just as it is true that the sun drives a water wheel because it places the water in a position from which it can fall and yield power in falling. The motor 6, (Fig. 10), places the spring 9 (Fig. 6) in a position from which its potential energy can fall and in falling yield power; but to view the matter from this angle is to be almost certain to miss the fundamental principles of the invention on the one hand, and its marvelous accuracy of operation and result on the other.

The spring 9 should be regarded as the propelling force, and the urgency or driving energy of the end thereof secured to the collar 21 (Fig. 6) is sensibly constant at all times. The variations in this urgency are rendered infinitesimal by the length and number of the coils of said spring, and the accuracy with which the end secured to the collar 20 is made to maintain its angular relation with the other end. If this angular variation at the collar 20 amounted to a whole revolution it would alter the urgency of the end at the collar 21 by an amount hardly appreciable.

When it is realized that its widest variation is probably but a few degrees, the constancy of the propelling force of the spring 9 becomes apparent. The whole function of the motor 6 is to maintain a constant urgency of the propelling spring by rotating the end secured to the collar 20 in sensible conformity to the rotation of the end at 21, and anything which would do this would serve the purpose equally well.

Given, now, this sensibly constant urgency of the spring 9, and a load which is all but constant, the speed of the flywheel 5 will vary only as minute frictional differences vary the load and as the urgency of the spring is infinitesimally altered by a slight angular change between its two ends. These slight variations are exactly compensated by the action of the retarding magnet 36, which increases the load on the fly-wheel the instant the same passes in the least beyond the predetermined speed, and decreases the said load the instant the speed of said fly-wheel falls to normal. The angular position of the collar 20 is maintained through the action of the relay operating the electromagnet 36.

The spring tongue 37 (Fig. 6$^a$) swings free in air, has no external friction whatsoever, has a working traverse estimated at but a small part of a thousandth of an inch, and is capable of exceedingly fine adjustment. In this way a synchronism is secured far more accurate than the most skilled ear can appreciate, and which, therefore, is one which from a musical standpoint is perfect.

In a musical sense, no device can properly be called a synchronizer until it produces such a constancy of pitch and quality as are pleasureable to music lovers. Anything less than this is utterly worthless, and anything more than this is increasingly better until the ear fails to appreciate the change,—which point marks practical perfection.

In our claims the coined word, "potentializer" is used to designate the motor 6 or its equivalent, because at the start it stores and then, in running, constantly maintains a proper degree of potential energy in the helical spring 9. By the expression "propelling factor", we designate the helical spring 9 or its equivalent; and by the expression "propelled factor", the flywheel 5 and the mechanism rotated synchronously with it.

We show in the drawings a greater plurality of sources of current than is necessary simply for clearness in illustration and description; but in practice we more or less combine them.

What we claim as our invention and for which we desire Letters Patent is as follows, to wit:—

1. A synchronizing mechanism comprising a propelling factor of sensibly constant operative urgency and a propelled factor of slightly varying resistance to motion, means for automatically regulating the degree of operative urgency of the propelling factor to the normal resistance of the propelled factor, means for maintaining the sensible constancy of this operative urgency, and means controlled by the speed of said propelled factor for securing and maintaining the aforesaid normal resistance of the propelled factor.

2. The combination with a rotating potentializer and a propelled factor rotated thereby, of a helical spring wound up at one end by the potentializer and communicating motion at its other end to the propelled factor, and means for maintaining uniformity of speed of the potentializer and the propelled factor.

3. The combination with a rotating potentializer and a rotated propelled factor, of a helical spring wound up at one end by the potentializer and communicating motion at its other end to the propelled factor, and a speed controlled means acting simultaneously when a predetermined speed is reached to retard the propelled factor and slow down the potentializer.

4. A synchronized mechanism comprising a potentializer, a propelled factor, a flywheel, a resiliently yielding connection between said fly-whel and potentializer, and a centrifugally controlled means for retarding said fly-wheel.

5. A synchronizing mechanism comprising a potentializer, a propelled factor, and a centrifugally controlled speed affecting means in two simultaneously operating sections, one acting to retard the propelled factor, and the other to slow down the potentializer, when they reach a predetermined speed.

6. A synchronizing mechanism comprising a potentializer, a propelled factor, and a centrifugally controlled speed affecting means in two simultaneously operating sections, one acting to retard the propelled factor, and the other to slow down the potentializer at a predetermined speed.

7. The combination with an electric motor, and a propelled factor, of a rotating peripherally continuous metallic body carried by said factor, an electromagnet having said body in its field, a source of current and a circuit between said source and said motor and electromagnet, said circuit including switching means, acting when the propelled factor departs from a predetermined speed to vary the current traversing said electromagnet and the field-windings of said motor, and serving to retard the rotary metallic body and through it the propelled factor.

8. A synchronized mechanism comprising a potentializer, a member rotated thereby, a propelled factor, an inner shaft having terminal bearings, a tubular shaft inclosing the inner shaft and having separate terminal bearings, a helical spring surrounding the inner shaft and attached at one end thereto and at its other end to the tubular shaft, connections between said member and the inner shaft, connections between the tubular shaft and the propelled factor, a flywheel carried by the tubular shaft, centrifugally operated contacts carried by the flywheel, a source of current and a circuit controlled by said contacts, and speed-controlling means actuated by said circuit.

9. A synchronizer comprising a fly-wheel, a shaft carrying said fly-wheel, and having an end thereof tubular, an extension fixed in said tubular end but insulated therefrom, centrifugally operated contacts carried by said fly-wheel, one of which contacts is in circuit with the fly-wheel but the other insulated therefrom, an electric connection between the last-named contact and said extension, and electrically actuated speed-controlling means in circuit with said fly-wheel and extension.

10. The combination of a rotating body, centrifugally operated contacts carried thereby, a copper annulus rotating with said body, an electromagnet having its poles presented at opposite surfaces of said annulus, a relay electromagnet, a source of current, circuits between said contacts and the last-named electromagnet, contacts controlled by the last-named electromagnet, and circuits between the last-named contacts and said source and first-named electromagnet.

11. The combination of a rotating body, centrifugally controlled contacts carried thereby, a motor adapted for driving said body, a source of current and circuits therefrom to said motor, a relay electromagnet, a source of current and circuits to said relay magnet and contacts, contacts controlled by said relay magnet, and connections between the last-named contacts and said motor.

12. The combination of a rotated propelled factor, a spring for the actuation thereof, a potentializer for winding said spring, and a fly-wheel turning with said potentializer; the inertia of said fly-wheel and potentializer being substantially that of the propelled factor.

13. The combination of a rotated propelled factor, a helical spring for the actuation thereof, a potentializer for winding said spring, and a fly-wheel turning with said potentializer; the inertia of said fly-wheel and potentializer being substantially that of the propelled factor.

14. The combination of a propelled factor, a potentializer for its actuation, a motor-generator, an electromagnet, a rotating pulsation producing device comprising part of said factor, connections between said electromagnet, pulsation device and the generator of said motor-generator, a source of current and connections for the motor of said motor-generator, and a switch for the last-named connections closed by the rotation of the potentializer and opened by the stopping of the same.

15. The combination of a propelled factor, a potentializer for its actuation, a motor-generator, an electromagnet, a rotating pulsation-producing device comprising part of said factor, connections between said electromagnet, pulsation device and the generator of said motor-generator, a source of current and connections for the motor of said motor-generator, a switch for the last-named connections, electromagnetic means controlling said switch, a source of current and connections for said means, partially yielding contacts in the last-named connections, a pivoted lever arm resiliently pressed toward said contacts, a contact-block carried by said arm into touch with said yielding contacts, and a centrifugal governor rotated by the potentializer and adapted when at rest to press said lever-arm and its block-contact away from the yielding contacts.

16. The combination of a rotating propelled factor, a centrifugally operated circuit closing device, a source of current, a relay electromagnet and connections between the same and said source and closing device, an electromagnet for applying a diamagnetic resistance to the rotation of the propelled factor, an electric motor, a direct-current source and connections for running said motor, connections between the last-named electromagnet and said direct-current source and the field windings of said motor, a switch in said connections controlled by the relay electromagnet, and a resistance shunted between the connection to said field-windings and said direct-current source.

In testimony that we claim the foregoing invention, we have hereunto set our hands this 17th day of December, 1912.

MELVIN L. SEVERY.
GEORGE B. SINCLAIR.

Witnesses:
EDWARD S. CROCKETT,
ESTHER R. PRUSSIAN.